(12) United States Patent
Mickael

(10) Patent No.: US 7,544,929 B1
(45) Date of Patent: Jun. 9, 2009

(54) BOREHOLE IMAGING AND STANDOFF DETERMINATION USING NEUTRON MEASUREMENTS

(75) Inventor: Medhat W. Mickael, Sugar Land, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 0 days.

(21) Appl. No.: 12/119,685

(22) Filed: May 13, 2008

(51) Int. Cl.
*G01V 5/10* (2006.01)
(52) U.S. Cl. .................................. 250/269.5
(58) Field of Classification Search ............... 250/256, 250/269.1, 269.2, 269.4, 269.5
See application file for complete search history.

(56) References Cited

U.S. PATENT DOCUMENTS

| | | | |
|---|---|---|---|
| 4,423,323 A * | 12/1983 | Ellis et al. ................ | 250/264 |
| 4,524,274 A | 6/1985 | Scott | |
| 4,760,252 A * | 7/1988 | Albats et al. ............ | 250/390.07 |
| 4,972,082 A | 11/1990 | Loomis | |
| 5,051,581 A | 9/1991 | Hertzog | |
| 5,300,770 A | 4/1994 | Allen | |
| 5,345,077 A | 9/1994 | Allen | |
| 5,532,481 A | 7/1996 | Mickael | |
| 5,539,225 A * | 7/1996 | Loomis et al. ........... | 250/269.4 |
| 5,596,191 A | 1/1997 | Mickael | |

OTHER PUBLICATIONS

Arnold, "Experimental Determination of Environmental Corrections for a Dual-Spaced Neutron Porosity Log" SPWLA 22nd Annual Logging Symposium, (24 pages) Jun. 23-26, 1981.

* cited by examiner

*Primary Examiner*—David P. Porta
*Assistant Examiner*—Marcus H Taningco
(74) *Attorney, Agent, or Firm*—Wong, Cabello, Lutsch, Rutherford, Brucculeri, L.L.P.

(57) ABSTRACT

Apparatus and methods for determining borehole diameter and standoff for neutron porosity logging systems. The apparatus comprises an isotopic neutron source, a single epithermal neutron detector and two thermal neutron detectors, where all detectors are at different axial spacings from the neutron source. Thermal neutron porosity is determined from the combined response of the thermal neutron detectors. Epithermal neutron porosity is determined from the response of the single epithermal neutron detector. Embodied as a wireline system, a difference between thermal neutron porosity and epithermal neutron porosity is used to compute a tool standoff, which in turn is used to correct the thermal neutron porosity for effects of standoff. Borehole size measurements are made independently and preferably with a mechanical caliper of a density tool subsection. Embodied as a LWD system, the difference between thermal neutron porosity and epithermal neutron porosity is used to correct the thermal neutron porosity measurement for both borehole diameter and radial position (standoff) of the tool within the borehole.

14 Claims, 6 Drawing Sheets

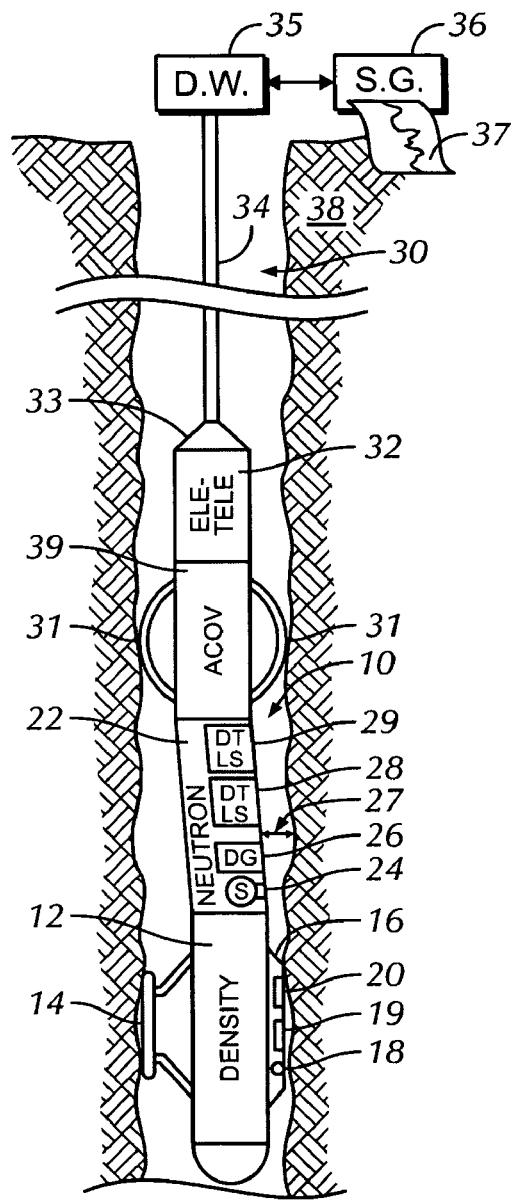
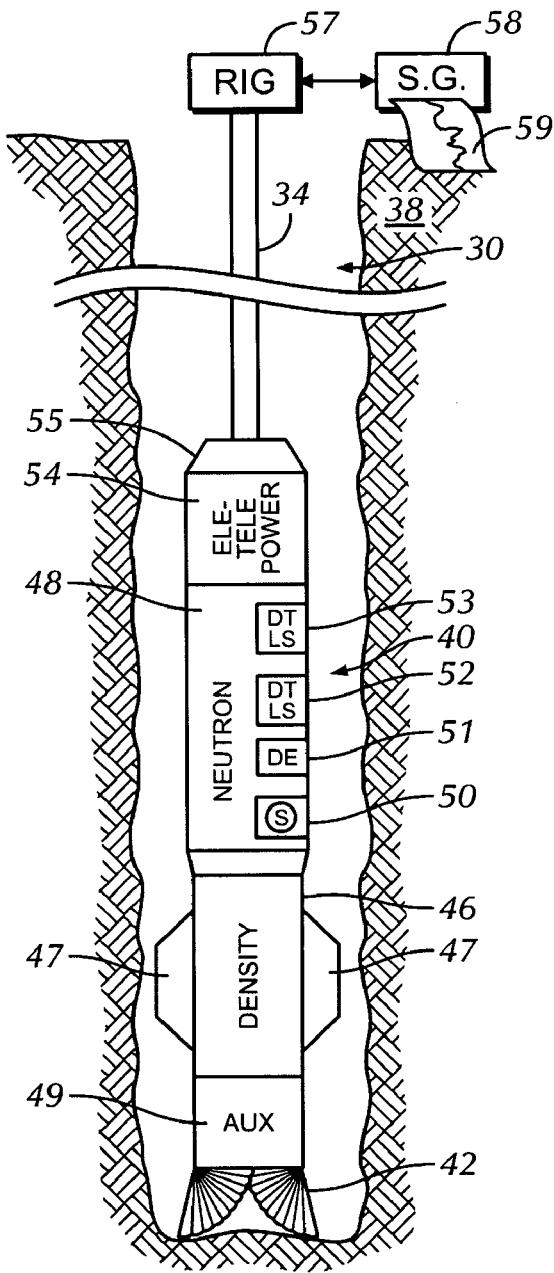
FIG. 1
FIG. 2

BOREHOLE IMAGING AND STANDOFF DETERMINATION USING NEUTRON MEASUREMENTS

FIELD OF THE INVENTION

This invention is related to the determination of borehole parameters and the radial position of borehole instrumentation within the borehole. More specifically, the invention is directed toward the determination of borehole diameter and standoff of instrumentation within the borehole using epithermal and thermal neutron measurements.

BACKGROUND

The element hydrogen (H) is very efficient moderator of energetic neutrons because of the relatively small difference in their masses. Thermal neutron porosity tools or subsections comprising a neutron source and at least one axially spaced thermal neutron detector is, therefore, very responsive to hydrogen content or "hydrogen index" of the environs in which it is disposed. In a large majority of earth formations, H is within fluid which is in the pore space of the formation. The response of a neutron porosity tool to hydrogen index can, therefore, be used to obtain an indication of pore space and therefore an indication of formation porosity.

Thermal neutron porosity tool response is also affected by borehole conditions such as borehole diameter and the radial position of the tool within the borehole, which is commonly referred to as "standoff". Tool response is further affected by elements with high thermal neutron cross sections. Examples of such elements are boron which is found in shale, and chlorine which is found in saline formation waters. Corrections applied to thermal neutron porosity measurements for effects such as these are commonly known as "environmental corrections". Finally, tool response is affected by neutron source strength, thermal neutron detector efficiency, source-detector geometry including shielding and axial spacing, and systematic factors in the electronics associated with the detector. The combination of responses of two thermal neutron detectors at different axial spacings from the source eliminates some of these adverse response factors.

Depending upon tool calibration conditions, additional corrections must be made. Wireline dual detector thermal neutron porosity tools are typically calibrated in a known formation with a "standard" diameter borehole and with the tool urged against the wall of the borehole. This radial position is commonly referred to as "decentralized" and with no standoff. In logging operations, borehole diameter can vary from "standard", and the tool can standoff from the borehole wall. Corrections for non standard borehole diameters are typically made in real time using the response of a mechanical wireline caliper. In addition, real time corrections for tool standoff are required to obtain accurate porosity readings. However, standoff measurements are not widely used and ad hoc corrections are typically made based on judgment of borehole conditions. Basic concepts of wireline dual detector thermal neutron porosity logging are disclosed U.S. Pat. No. 4,004,147, which is herein entered into this disclosure by reference. Environmental corrections for wireline dual detector thermal neutron porosity logs are disclosed in the publication "Experimental Determination of Environmental Corrections for a Dual-Spaced Neutron Porosity Log", D. M. Arnold et al, paper VV, 22nd Annual Logging Symposium Transactions: Society of Professional Well Log Analyst.

Dual detector thermal neutron logging methodology is also applicable to logging-while-drilling (LWD) systems. The basic concepts are the same as those used in the wireline counterpart. LWD tools or subsections are again calibrated in known formations with a "standard" borehole diameter, but with the tool radially centered or "centralized" within the borehole. Unlike the wireline counterpart, mechanical calipers can not be used in LWD systems to measure borehole diameter. Acoustic standoff measurements have been used with fairly good accuracy under most conditions, but can suffer from poor signal if the acoustic waves are not perpendicular to the borehole wall. Acoustic standoff measurements also suffer from inaccuracies due to changes in the mud acoustic properties. Three acoustic sensors placed at 120 degrees from each other are required to obtain a more accurate borehole diameter measurement in LWD systems. Standoff determination from an independent LWD density measurement has been also used with fair accuracy under nominal borehole conditions, but it is adversely affected by changes in the mud density. Moreover, determination of standoff from density measurements is only valid in non-barite mud, which is a major limitation of this approach. Since both the density and the acoustic sensors are focused measurements and "see" only in front of them, borehole diameter measurements in LWD systems generally have less accuracy than standoff measurements. Reliable, real time corrections for borehole diameter and the radial position of the tool within the borehole (i.e. standoff) are needed to obtain accurate LWD neutron porosity measurements.

Measures of epithermal neutrons have been used to enhance or correct dual thermal neutron porosity measurements. Because epithermal neutron flux is typically less than corresponding thermal neutron flux, and because epithermal neutron detectors are less efficient per unit volume than thermal neutron detectors, epithermal detector axial spacing from the neutron source is necessarily smaller to obtain statistically significant measurements. This reduced axial spacing also reduces the radial depth of investigation of the measurement. These factors further discourage the use of dual epithermal neutron detectors at different axial spacings. The use of epithermal neutron measurements to correct thermal neutron porosity measurements has been predominately in the field of pulsed rather than continuous or isotropic neutron sources. Basic concepts of epithermal neutron porosity measurements are disclosed in U.S. Pat. Nos. 5,532,481 (Mickael) and 5,596,191 (Mickael), both of which are herein entered into this disclosure by reference.

SUMMARY OF THE INVENTION

The invention uses a tool (or subsection if operated in combination with other types of logging subsections) comprising a continuous or isotopic neutron source, a single epithermal neutron detector and two thermal neutron detectors, where all detectors are at different axial spacings from the neutron source. Thermal neutron porosity is determined from the combined response of a first or "short spaced" thermal neutron detector at a first axially spacing and a second or "long spaced" thermal detector at a second axial spacing. The second spacing is greater than the first spacing. Epithermal neutron porosity is determined from the response of the single epithermal neutron detector, which is axially spaced closer the neutron source than either of the thermal neutron detectors.

Embodied as a wireline system, a difference between thermal neutron porosity and epithermal neutron porosity is used to compute a tool standoff, which in turn is used to correct the thermal neutron porosity for effects of standoff. Borehole size measurements are made independently and preferably with a mechanical caliper of a density tool subsection. Embodied as a LWD system, the difference between thermal neutron porosity and epithermal neutron porosity is used to correct the thermal neutron porosity measurement for both borehole diameter and radial position (standoff) of the tool within the borehole.

The corrected porosities are determined in real time. The method is relatively independent of borehole salinity, formation salinity and is operable in boreholes ranging from 6.0 to 12.0 inches (15.2 to 30.5 centimeters). The system also operates in barite mud. Formation lithology and mud weight must be input. Estimates of mud weight are typically known, and formation lithology can be obtained by combining apparent neutron porosity, density porosity, and acoustic porosity using methodology well known in the art.

BRIEF DESCRIPTION OF THE DRAWINGS

The manner in which the above recited features and advantages, briefly summarized above, are obtained can be understood in detail by reference to the embodiments illustrated in the appended drawings.

FIG. 1 illustrates the invention embodied as a wireline logging tool suspended within a well borehole;

FIG. 2 illustrates the invention embodied as a logging-while-drilling tool suspended within a well borehole;

DETAILED DESCRIPTION OF THE PREFERRED EMBODIMENTS

Embodiments of the Invention

Figure 3A:
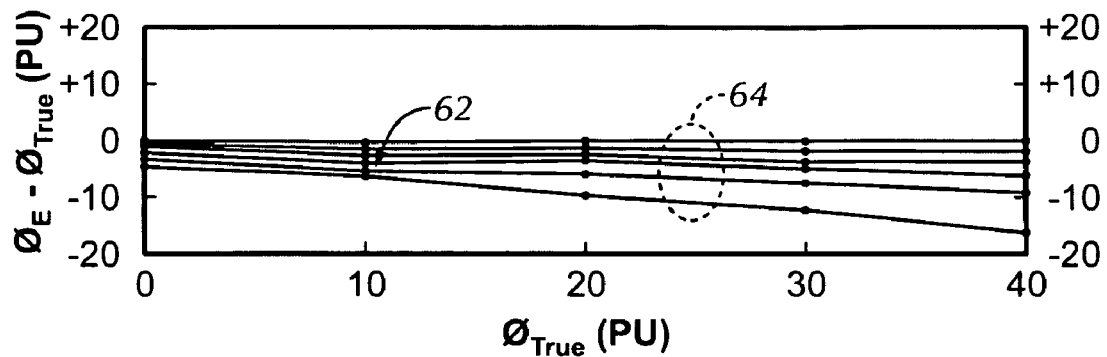
FIG. 3a illustrates $(\Phi_E-\Phi_{TRUE})$ versus $\Phi_{TRUE}$ for a wireline neutron porosity subsection in an 8 inch (20.3 centimeter) borehole and no standoff.

The invention can be embodied as a wireline system or as a logging-while-drilling system.

FIG. 1 illustrates a wireline logging tool 10 suspended within a well borehole 30 penetrating earth formation 38. The top of the tool 10 is operationally connected to a wireline 34 by means of a suitable tool "head" 33. The wireline cable 34 cooperates with a draw works at the surface to convey the tool along the borehole 30. Such draw works are well known in the art, and represented conceptually at 35. The wireline cable 34 also serves as a means for conveying the tool along the borehole 30 as well as a data and power conduit between the tool 10 and surface equipment 36. The surface equipment 36 comprises power sources, control circuits, preferably a surface processor and recording equipment to generate a log 37 of measured parameters as a function of depth within the borehole.

The tool 10 typically comprises a combination of "subsections" with each subsection being designed to measure a specific type of borehole or formation parameter. A density subsection 12 is depicted in FIG. 1 at the bottom of the tool 10. An articulating pad 16 comprises a gamma ray source 18 and two axially spaced gamma ray detectors 19 and 20. The articulating pad is urged against the wall of the borehole 30 by a mechanical backup arm 14. The density subsection is calibrated to operate radially decentralized in the borehole. Details of the theory and operation of dual detector pad type gamma ray systems are well known in the art.

Again referring to FIG. 1, a neutron porosity subsection 22 is disposed above the density subsection. The neutron porosity subsection comprises a neutron source 24. The neutron source 24 is an isotopic source, such as Americium-Beryllium (AmBe), Californium-252 (252Cf), or any isotopic source emitting neutrons in the epithermal energy range. An epithermal neutron detector 26 is axially spaced from the neutron source 24. The epithermal neutron detector 26 used in the system of this disclosure comprised a He-3 gas detector at 10 atmospheres and with an active volume 1.00 inch (2.54 centimeters) in diameter and 1.00 inch long. The detector 26 is disposed within a PEEK housing with 15% boron (3% 10B) to render the detector mainly responsive to epithermal neutrons. The active center of the detector is axially spaced about 4.5 inches (11.4 centimeters) from the source 24, but test indicate that variations in axial spacing from 2.0 to 7.0 inches (5.1 to 17.8 centimeters) have little effect on final results. The neutron porosity subsection 22 is preferably calibrated to operate radially decentralized in the borehole, and therefore should be operated no standoff. Any standoff will induce error in the measured parameter of interest and must be mathematically corrected to obtain desired results.

Still referring to FIG. 1, an acoustic subsection 39 is shown disposed above the neutron porosity subsection 22. The acoustic subsection is calibrated to operate radially centralized within the borehole. Centralization is obtained using such as bow springs 31, power centralizers and the like. An electronics subsection 32 is disposed above the acoustics subsection 39.

Considering the radial positioning of the all subsections comprising the wireline tool 10, it is apparent that the neutron porosity subsection 22 can standoff 1.0 to 2.0 inches (2.54-

5.08 centimeters) as indicated at 27 with some degree of tilt. Corrections for standoff must be made in order to obtain accurate and precise neutron porosity measurements.

Apparatus and methods of the present invention provide a measure of neutron porosity subsection standoff by combining responses of the thermal neutron detectors and the epithermal neutron detector. Details will be presented in a subsequent section of this disclosure. A measure of borehole diameter is typically obtained independently such as from the response of the mechanical caliper of the density subsection 12.

FIG. 2 illustrates a logging-while-drilling (LWD) logging tool 40 suspended within a well borehole 30 again penetrating earth formation 38. The top of the tool 10 is operationally connected to a drill string 56 with a suitable connector 55. The drill string terminates at a rotary drilling rig, which is well known in the art and is represented conceptually at 57. The drill string 56 serves as a means for conveying the tool 40 along the borehole 30 and can function as an element for conveying data between the tool 40 and surface equipment 58. The surface equipment 58 typically comprises recording equipment to generate logs 59 of measured parameters as a function of depth within the borehole.

Still referring to FIG. 2, the tool 40 is terminated at the lower end by a drill bit 42. An auxiliary subsection 49 can optionally contain additional LWD sensors or borehole directional control instrumentation. Moving up the tool, a density subsection 46 is shown with stabilizer blades 47 that tend to dispose the subsection near the center of the borehole. The density subsection preferably comprises a gamma ray source and at least two axially spaced gamma ray detectors as discussed in the discussion of its wireline counterpart. A neutron porosity subsection 48 is shown disposed above the density subsection 46. The neutron porosity subsection 48 comprises a neutron source 50, an epithermal neutron detector 51, and two axially spaced thermal neutron detectors 52 and 53 of the same type as its wireline counterpart. An acoustic subsection is not shown. An electronics and power section 54 is shown above the neutron subsection, and provides control electronics, at least one downhole processor, telemetry and power for other subsections of the tool 40.

The neutron porosity concepts of the present invention can be applied to LWD systems as well as wireline systems. There are, however, some differences in the implementation. First, unlike the wireline neutron porosity subsection 22 that is calibrated to operate radially decentralized within the borehole, LWD neutron porosity subsection 48 is calibrated to operate radially centralized in the borehole. If the subsection 48 is centralized within the borehole, standoff is azimuthally constant and the effects are correctable. In practice, an LWD neutron tool subsection is never exactly centralized within the borehole. Standoff can vary as the LWD tool 40 rotates within the borehole 30. Moreover, washouts in the borehole wall make the borehole seen by a rotating neutron porosity subsection 48 asymmetric and therefore a function of the azimuthal position of the subsection. Appropriate corrections must be made for standoff as a function of azimuthal rotation.

The second difference between wireline tool 10 (FIG. 1) and a LWD tool (FIG. 2) is the lack of a mechanical borehole caliper measurement in the LWD tool. A prior knowledge of borehole diameter (such as a bit diameter) can be used as a substitute "caliper" but variation in borehole diameter due to washouts can have significant effects on neutron porosity measurements. Furthermore, borehole diameter typically varies with depth, and different diameter tools are used in different nominal borehole sizes. Since borehole diameter is also required to obtain accurate and precise LWD results, a borehole diameter must be measured radially as the LWD tool rotates.

Apparatus and methods of the present invention can be used in LWD systems to determine both the borehole diameter and radial standoff as the tool rotates. Details of for determining radial position of the tool within the borehole (i.e. standoff) and borehole diameter as a function of borehole azimuth are presented in subsequent sections of this disclosure.

Basic Concepts of the Measurement

Thermal neutron porosity is determined from the combined response of a first or "short spaced" thermal neutron detector at a first axially spacing and a second or "long spaced" thermal detector at a second axial spacing. The second spacing is greater than the first spacing. A general equation for thermal neutron porosity is $$\Phi_{TH}=A_{th}+B_{th}(C_{SS}/C_{LS})+C_{th}(C_{SS}/C_{LS})^2 \quad (1)$$

where $\Phi_{TH}$=thermal neutron porosity;

$C_{LS}$=the count rate recorded in the long spaced detector;

$C_{SS}$=the count rate recorded in the short spaced detector; and $A_{th}$, $B_{th}$, and $C_{th}$ are calibration constants that are functions of borehole size and standoff. Other polynomial or rational polynomial functions can be used to relate the neutron count rate ratio to porosity.

It should be noted that since the ratio of detector count rates is used, the effects of source strength, detector efficiencies, source and detector geometries, source-detector axial spacings, and systematic detector circuit characteristics mathematically "cancel". Details of this dual detector thermal neutron porosity measurement have been previously entered into this disclosure by reference.

Epithermal neutron porosity is determined from the response of a single epithermal neutron detector axially displaced from the neutron source. Because of reduced sensitivity per unit volume of the epithermal neutron detector, the axial spacing is less than either of the thermal neutron detectors. A general equation for epithermal neutron porosity is $$\Phi_E=A_e+B_e(C_{EPI})+C_e(C_{EPI})^2 \quad (2)$$

where $\Phi_E$=thermal neutron porosity;

$\Phi_{EPI}$=the inverse of the count rate recorded in the epithermal neutron detector;

$A_e$, $B_e$ and $C_e$, are calibration constant that are function of neutron source strength, detector efficiency, source-detector geometry, source-detector spacing, borehole diameter, and standoff. Other functions can be used to describe the relationship between the epithermal neutron count rate and porosity.

Epithermal neutron porosity measurements are disclosed in more detail in disclosures previously entered by reference. It is noted that since only one epithermal detector is used, the effects of neutron source strength, detector efficiency, source-detector geometry, source-detector spacing do not cancel mathematically as they do in the dual thermal neutron detector measurement. As a result, the epithermal portion of the neutron porosity tool must be environmentally calibrated frequently, and it is preferred that a specific neutron source always be used with a specific tool.

Epithermal neutron porosity response was modeled for a wide range of borehole conditions, formation conditions, and neutron tool standoff. These results are summarized in FIGS. 3a-3c, which are graphical representations of the difference between measured epithermal neutron porosity and true formation porosity ($\Phi_E$-$\Phi_{TRUE}$) plotted as a function of true formation porosity. In each illustration, borehole salinity ranges from 0 to 250 thousand parts per million (Kppm) NaCl, formation salinity ranges from 0 to 250 Kppm NaCl, mud weight ranges from 8.33 to 18 pounds per gallon, and lithologies are limestone, dolomite, sandstone and shale.

FIG. 3a illustrates ($\Phi_E$-$\Phi_{TRUE}$) versus $\Phi_{TRUE}$ for an 8 inch (20.3 centimeter) borehole and no tool standoff. Clusters of modeled data points are shown at true porosities 0.0, 10, 20 30 and 40 porosity units (pu). The curves 64 fitted through corresponding data points are relatively flat and are not strong functions of true porosity. All values of ($\Phi_E$-$\Phi_{TRUE}$) are negative, which can be used as a rejection criterion in determining borehole size and tool standoff.

Figure 3B:
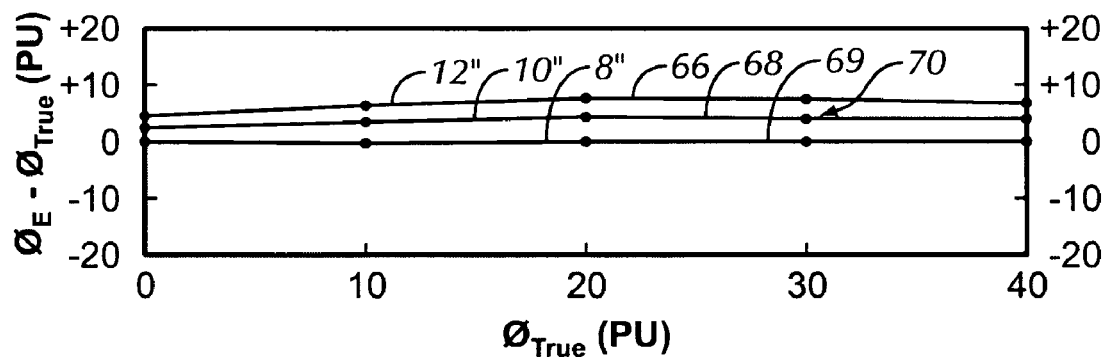
FIG. 3b illustrates $(\Phi_E-\Phi_{TRUE})$ versus $\Phi_{TRUE}$ for a wireline neutron porosity subsection for boreholes of diameters 8.0 inch (20.3 centimeter), 10 inch (25.4 centimeter) and 12 inch (30.5 centimeter)

FIG. 3b illustrates ($\Phi_E$-$\Phi_{TRUE}$) versus $\Phi_{TRUE}$ for boreholes of diameters 8.0 inch (20.3 centimeter), 10 inch (25.4 centimeter) and 12 inch (30.5 centimeter). As in FIG. 3a, there is no tool standoff. Data points 70 are again shown at true porosities 0.0, 10, 20 30 and 40 porosity units (pu). The curves 66, 68 and 69 representing ($\Phi_E$-$\Phi_{TRUE}$) are fitted through corresponding data points are again not a strong function of true porosity. All values of ($\Phi_E$-$\Phi_{TRUE}$) are positive. Variations in ($\Phi_E$-$\Phi_{TRUE}$) as a function of borehole diameter are significant across the entire range of formation porosity from 0.0 to 40 pu. This measurement can, in principle, be used to determine borehole diameter. In wireline systems, the articulating pad and backup arm of the density subsection (see FIG. 1) yields an accurate measure of borehole diameter. It is preferred that this measure of borehole be used to correct measures of ($\Phi_E$-$\Phi_{TRUE}$) to a nominal borehole diameter, which has been selected as 8.0 inch is for purposes of illustration.

Figure 3C:
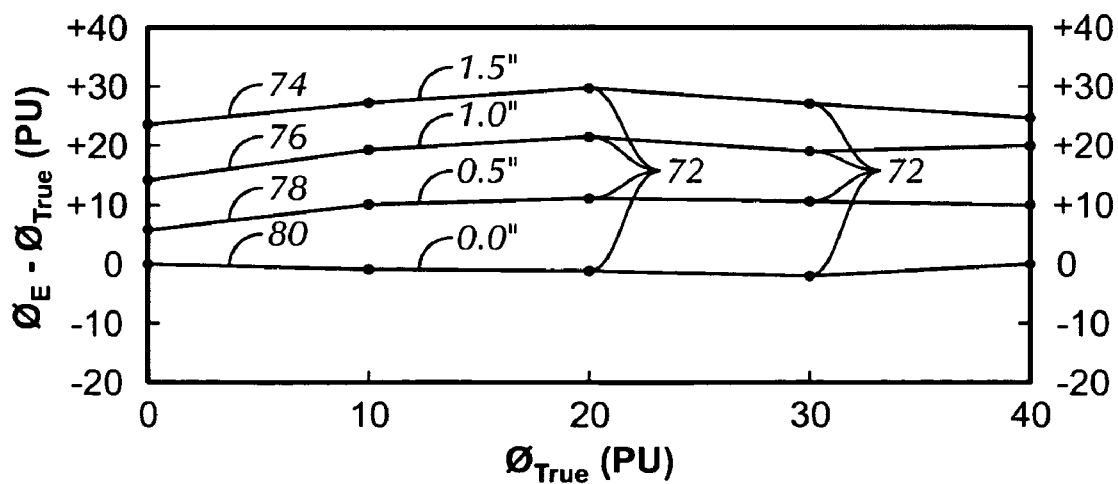
FIG. 3c illustrates $(\Phi_E-\Phi_{TRUE})$ versus $\Phi_{TRUE}$ for wireline neutron porosity subsection standoffs of 0.0, 0.5, 1.0 and 1.5 inches (0.0, 1.27, 2.54, and 3.81 centimeters) respectively.

FIG. 3c illustrates ($\Phi_E$-$\Phi_{TRUE}$) versus $\Phi_{TRUE}$ tool standoffs of 0.0, 0.5, 1.0 and 1.5 inches (0.0, 1.27, 2.54, and 3.81 centimeters) respectively. The modeled data points are represented at 72 and have been corrected for borehole size to a nominal 8.0 inches. Data points 72 are again shown at true porosities 0.0, 10, 20 30 and 40 porosity units (pu). The curves 80, 78, 76 and 74 representing ($\Phi_E$-$\Phi_{TRUE}$) representing standoffs of 1.5, 1.0, 0.5 and 0.0 inches (3.81, 2.54, 2.27, and 0.0 centimeters), respectively, are not a strong function of true porosity. All values of ($\Phi_E$-$\Phi_{TRUE}$) are positive. Variations in ($\Phi_E$-$\Phi_{TRUE}$) as a function of standoff are quite significant across the entire range of formation porosity from 0.0 to 40 pu. This measurement is, therefore, used to determine tool standoff.

Wireline Applications

The wireline "combination tool 10 comprises a density subsection 12, a neutron porosity subsection 22, and an acoustic subsection 30 shown in FIG. 1 will be used illustrate the invention embodied in a wireline system. As mentioned previously, the centralized acoustic section disposed above the neutron porosity subsection and the decentralized density subsection disposed below the neutron porosity subsection typically introduces unwanted tilt and standoff in the neutron porosity subsection.

Figure 4:
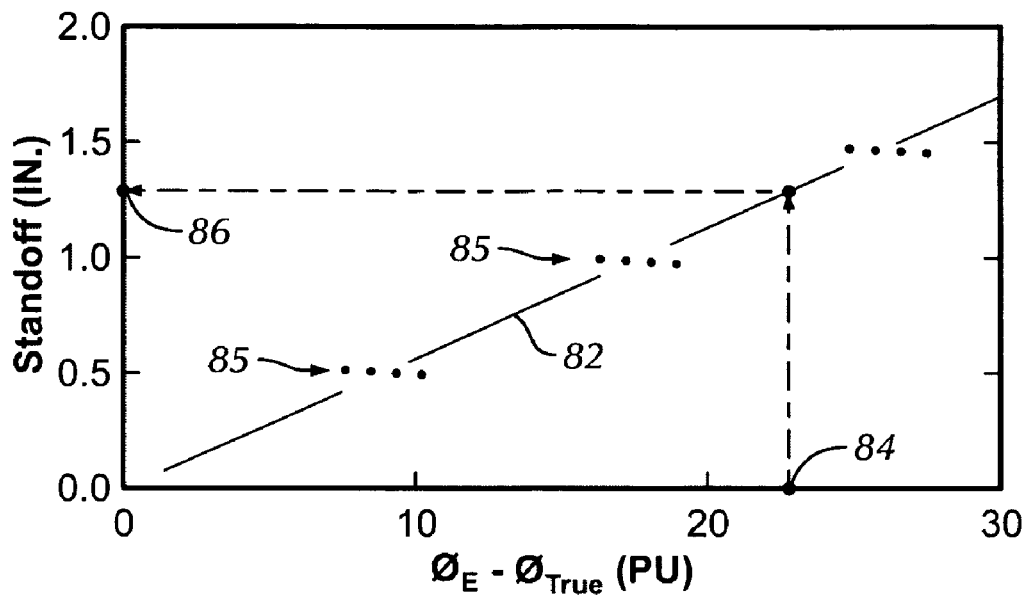
FIG. 4 illustrates true neutron porosity subsection standoff for a wireline neutron porosity subsection plotted as a function of $(\Phi_E-\Phi_{TRUE})$.
Figure 5:
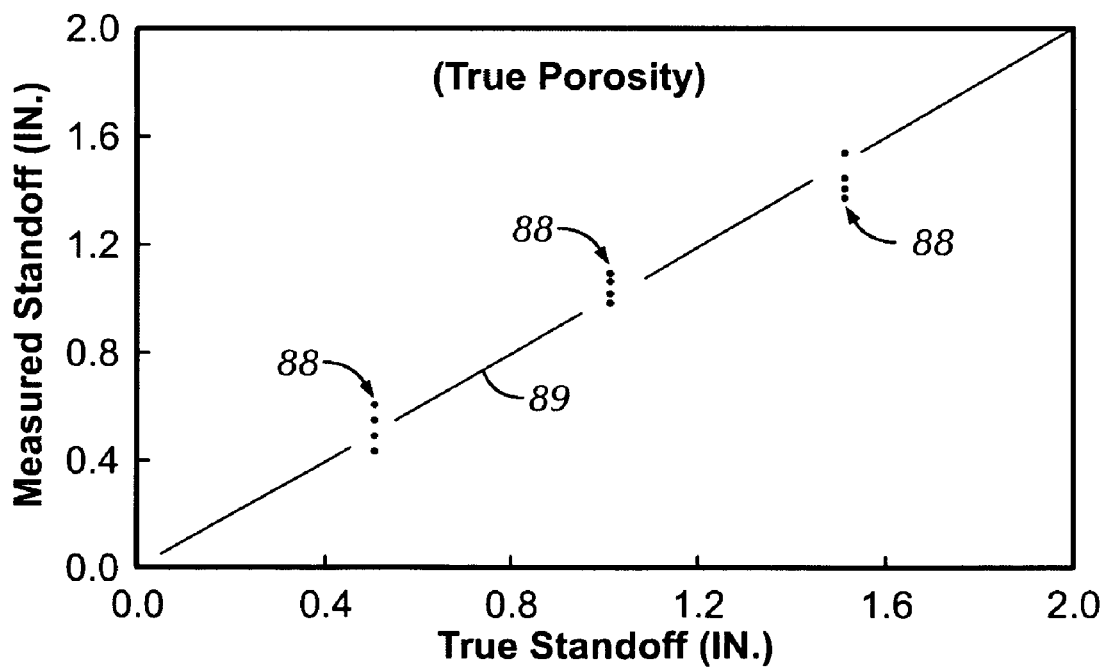
FIG. 5 illustrates a corresponding plot of measured standoff as a function of true standoff for a wireline neutron porosity subsection.

Using data discussed in previous graphical presentations, true tool standoff (in inches) is plotted as a function of ($\Phi_E$-$\Phi_{TRUE}$) in FIG. 4. A straight line 82 has been fitted through the data points 85 measured at tool standoffs of 0.0, 0.5, 1.0, and 1.5 inches (0.0, 1.27, 2.54 and 3.81 centimeters). The slope of the line 82 indicates a sensitivity in ($\Phi_E$-$\Phi_{TRUE}$) of about 20 pu per inch of standoff. For a measured or estimated value 84 of ($\Phi_E$-$\Phi_{TRUE}$), a corresponding measured value of standoff 86 can be determined, as illustrated graphically in FIG. 4. If $\Phi_{TRUE}$ is estimated from the response of the density subsection 12 (see FIG. 1), FIG. 5 shows a corresponding plot of measured standoff as a function of true standoff. A line 89 has been fitted through the data points 88 measured at true tool standoffs of 0.0, 0.5, 1.0, and 1.5 inches. Considering the scatter of data points, the accuracy of the measured standoff is of the order of +/−0.15 inches (0.38 centimeters).

Figure 6:
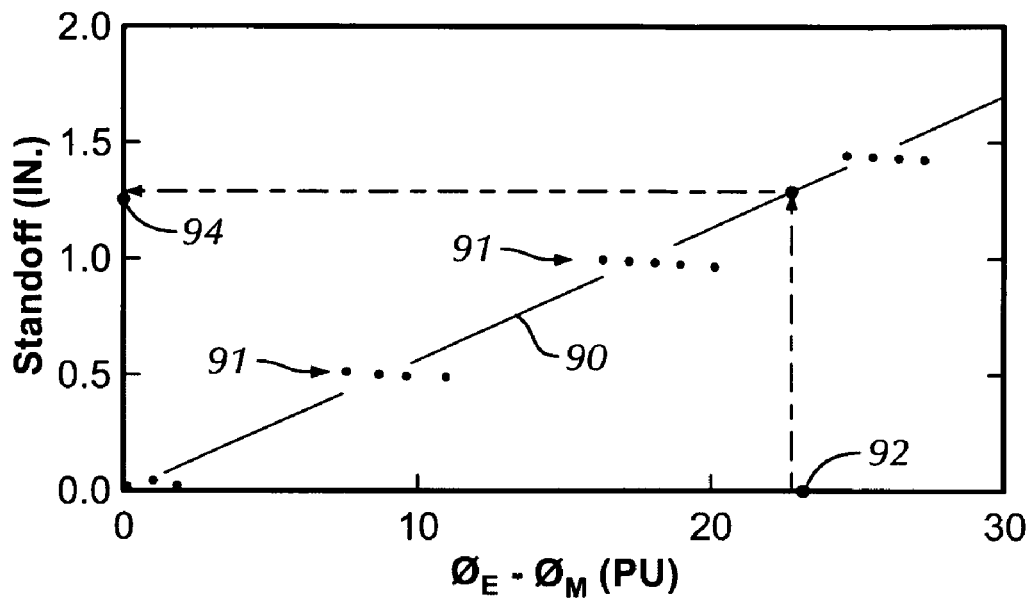
FIG. 6 is similar to FIG. 4 but shows tool standoff for a wireline neutron porosity subsection plotted as a function $(\Phi_E-\Phi_{Th})$ for standoffs of 0.0, 0.5, 1.0, 1.5 inches (0.0, 1.27, 2.54, and 3.81 centimeters)
Figure 7:
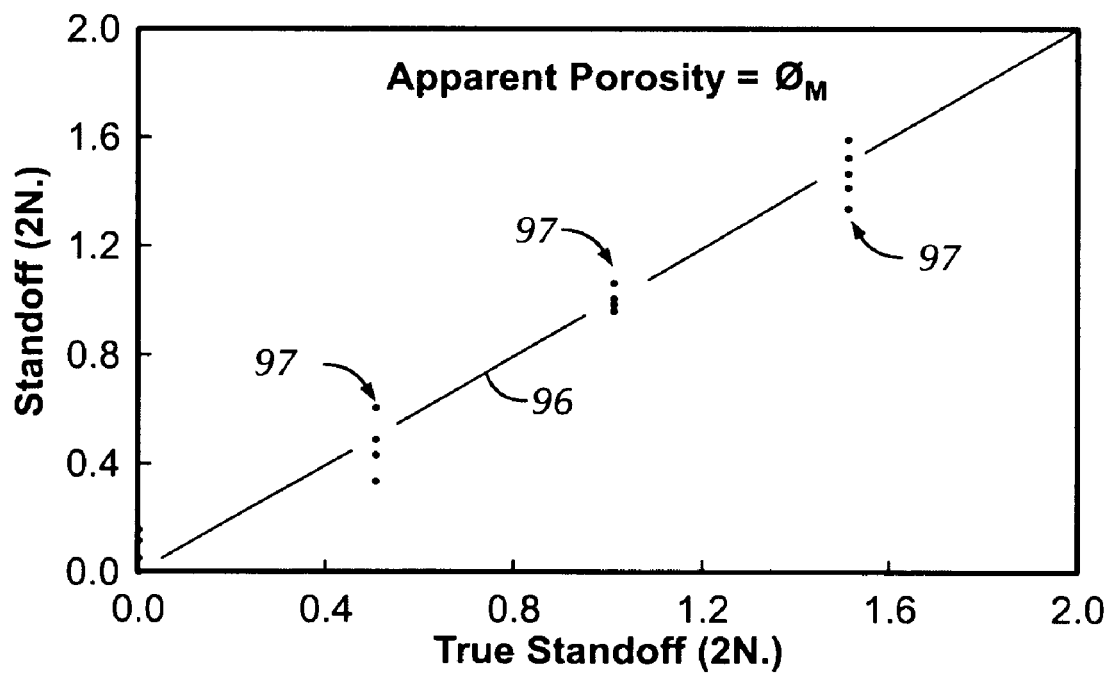
FIG. 7 shows a corresponding plot of measured standoff as a function of true standoff for a neutron porosity subsection.

FIG. 6 is similar to FIG. 4 but shows tool standoff plotted as a function ($\Phi_E$-$\Phi_{Th}$) for tool standoffs of 0.0, 0.5, 1.0, and 1.5 inches (0.0, 1.27, 2.54 and 3.81 centimeters). The parameter $\Phi_{Th}$ is an apparent thermal neutron porosity obtained from the response of the (uncorrected) thermal neutron porosity measurement of subsection 22 shown in FIG. 1. A straight line 90 has been fitted to the data points data points 91 measured at tool standoffs of 0.0, 0.5, 1.0, and 1.5 inches. The slope of the line 90 again indicates a sensitivity in ($\Phi_E$-$\Phi_{Th}$) of about 20 pu per inch of standoff. For a measured value 92 of ($\Phi_E$-$\Phi_{Th}$), a corresponding measured value of standoff 94 can be determined, as illustrated graphically in FIG. 6. With $\Phi_{Th}$ being a porosity estimate obtained from the thermal neutron portion of the neutron porosity subsection 22 (see FIG. 1), FIG. 7 shows a corresponding plot of measured standoff as a function of true standoff. A line 96 has been fitted through the data points 97 measured at true tool standoffs of 0.0, 0.5, 1.0, and 1.5 inches (0.0, 1.27, 2.54 and 3.81 centimeters). Considering the scatter of data points, the accuracy of the measured standoff is somewhat less (but still acceptable) than the accuracy using a density porosity as shown in FIG. 5.

At this point, wireline neutron porosity subsection standoff (SO) has been obtained using methodologies of the present invention. Borehole diameter (BHD) has been obtained from an independent measurement such as a mechanical caliper of a density subsection. A corrected thermal neutron porosity for a wireline system, $\Phi_{C,WL}$ corrected for all environmental conditions is obtained using methods set forth in the previously referenced "Experimental Determination of Environmental Corrections for a Dual-Spaced Neutron Porosity Log". The general mathematical functional relationship $F_W$ for wireline tools is $$\Phi_{C,WL} = F_W(\Phi_{Th}, SO, BHD, ENV) \quad (3)$$

where ENV are other environmental corrections discussed in the "Experimental Determination of Environmental Corrections for a Dual-Spaced Neutron Porosity Log" and $\Phi_{TH}$ is given in equation (1).

Measured data are preferably telemetered to the surface via a wireline telemetry system, and computations are preferably performed in the surface processor disposed in the surface equipment 36.

LWD Applications

As mentioned previously, the same neutron porosity concepts can be applied in both wireline and LWD systems. LWD applications require radial determinations of borehole diameter and tool standoff. The neutron porosity subsection 48 (see FIG. 2) is calibrated to operate radially centralized within a borehole of a given diameter. In practice, the subsection is never exactly centralized within the borehole. As an example, assume that the density-neutron porosity combination LWD tool 40 depicted in FIG. 2 has a stabilizer blade 47 diameter of 8.25 inches (30.0 centimeters) and a neutron porosity subsection of 7.2 inches (18.3 centimeters) in diameter. This size of tool is typically run in 8.5 inch (21.6 centimeter) diameter borehole. If a density blade 47 is on the low side of the borehole 30, the neutron porosity subsection 48 is standing off 0.55 inches (1.40 centimeters) from the low side of the borehole, and standing off 0.75 inches (1.91 centimeters) from the high side of the borehole. Therefore, standoff can vary as the LWD tool 40 rotates within the borehole 30. Moreover, washouts in the borehole wall make the borehole seen by a rotating neutron porosity subsection 48 asymmetric.

As also mentioned previously LWD tool 40 lacks a mechanical borehole caliper measurement in LWD tool. Stated another way, borehole diameter can not be measured mechanically with a rotating LWD tool. A prior knowledge of borehole diameter (such as a bit diameter) can not be used as a substitute for a caliper since borehole diameter typically varies with depth, and different diameter tools are used in different nominal borehole sizes.

Apparatus and methods of the present invention can be used in LWD systems to determine both the borehole diameter and radial standoff as the tool rotates. Results can be presented as cross sectional "images" of the tool within the borehole. Both of borehole diameter and standoff values are needed to correct the thermal neutron porosity measurement. In addition a borehole image has many applications in the areas of drilling mechanics and borehole stability.

The difference between the near epithermal and traditional thermal neutron porosity ($\Phi_E$-$\Phi_{Th}$) can be used to first determine an apparent borehole diameter at predetermined azimuthal angles as the LWD tool 40 rotates. These azimuthal apparent borehole diameters can then be to determine an average borehole diameter and azimuthal standoffs. The preferred methodology is to use a comprehensive algorithm to determine the apparent borehole diameter, where the algorithm uses responses and combinations of responses from the two thermal and one epithermal neutron detector to compensate for various borehole and formation effects. Since there are three detectors 51, 52 and 53 in the neutron porosity subsection 48, the following detector responses and combination detector responses are available:

$R_{SS/LS}$=$C_{SS}/C_{LS}$=the ratio of the short spaced thermal to the long spaced thermal detector count rate;

$R_{E/SS}$=$C_{EPI}/C_{SS}$=the ratio of the epithermal to the short spaced thermal detector count rate;

$R_{E/LS}$=$C_{EPI}/C_{LS}$=the ratio of the epithermal to the long spaced thermal detector count rate;

$1/C_{SS}$=the inverse of the short spaced thermal detector count rate;

$1/C_{LS}$=the inverse of the long spaced thermal detector count rate; and $1/C_{EPI}$=the inverse of the epithermal detector count rate It has been found that a general relationship of the following form is best suited for (apparent) borehole size determination:

$$BHD=F(\Phi(R_{SS/LS}),(\Phi(R_{SS/LS})-\Phi(1/C_{EPI})),(\Phi(1/C_{EPI})-\Phi(1/C_{SS}),MW,MIN) \quad (4)$$

where BHD is the apparent borehole diameter, $\Phi(X)$ is the apparent porosity computed using detector responses and combination detector responses listed above, MW and MIN are mud weight and formation mineralogy that must be input from independent sources, and F is a linear or a quadratic function. A large set of modeling data was used to test this algorithm shown in general form in equation (4). These data were generated for a 6.75 inch (17.1 centimeter) diameter LWD neutron porosity subsection 48, borehole diameters ranging from 8.5 to 10 inches (21.6 to 25.4 centimeters), mud weights ranging from 8.33 to 18 pounds per gallon, borehole water salinities ranging from 0 to 250 thousand parts per million (Kppm) NaCl, formation salinities ranging from 0 to 250 Kppm, and for limestone, dolomite, sandstone, and shale formations with porosity ranging from 0 to 60 percent. As indicated, the borehole characterization function shown in equation (4) requires two input parameters:

(1) formation mineralogy (limestone, dolomite, sand/shale); and (2) mud weight

However, the algorithm is self compensating for the effects of formation porosity, borehole water salinity, and formation salinity.

Figure 8:
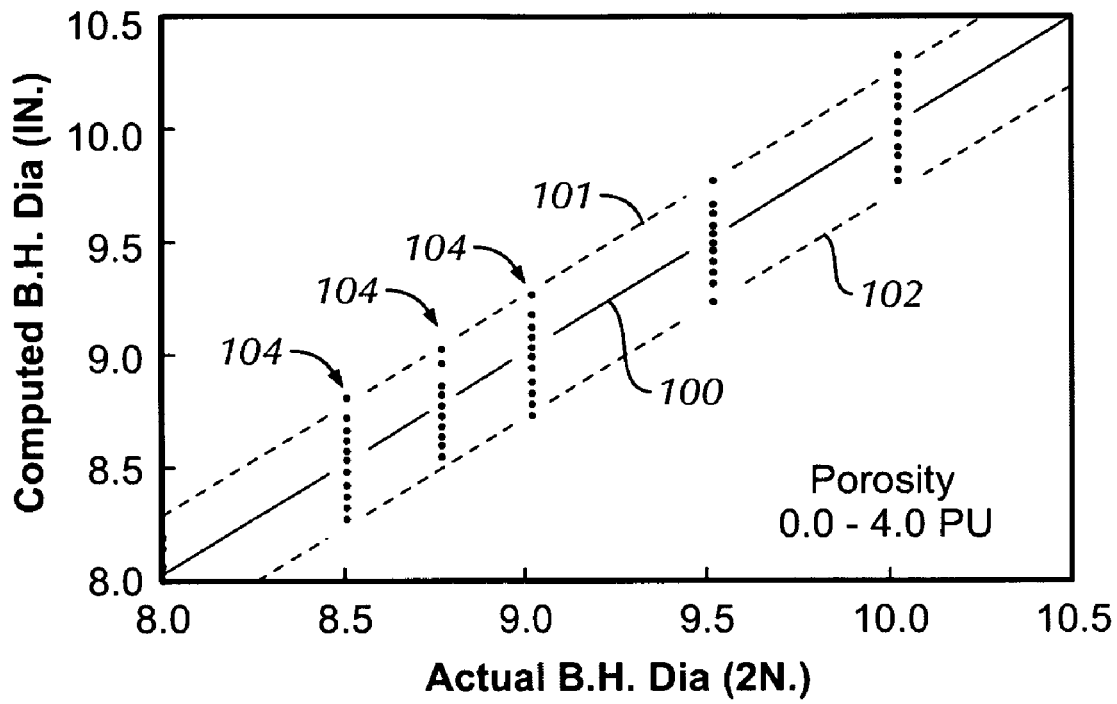
FIG. 8 is a plot of computed borehole diameter as a function of actual borehole diameter for a LWD neutron porosity subsection.

FIG. 8 is a plot of computed borehole diameter as a function of actual borehole diameter using the algorithm shown in equation (4). This plot illustrates the accuracy of the calculated borehole diameter with the neutron porosity subsection centered in the borehole, and for the above states borehole and formation conditions after correcting for mud weight and formation mineralogy. Clusters of data points at the designated actual borehole diameters are shown at 104. A straight line 100 has been fitted to these data for borehole diameters ranging from 8.0 to 10 inches (21.6 to 25.4 centimeters). The scatter of the data is illustrated by the lines 101 and 102. The accuracy of the algorithm is +/−0.25 inches (+/−0.64 centimeters) up to borehole diameters of 10 inches (2.54 centimeters).

Equation (4) is the apparent borehole diameter at any azimuthal angle. The average of the apparent diameters at all angles (from 0 to 360 degrees) is the average borehole diameter. The difference between the apparent borehole diameter at a given azimuthal angle and the average borehole diameter (divided by 2) is tool standoff at that azimuthal angle.

Figure 9:
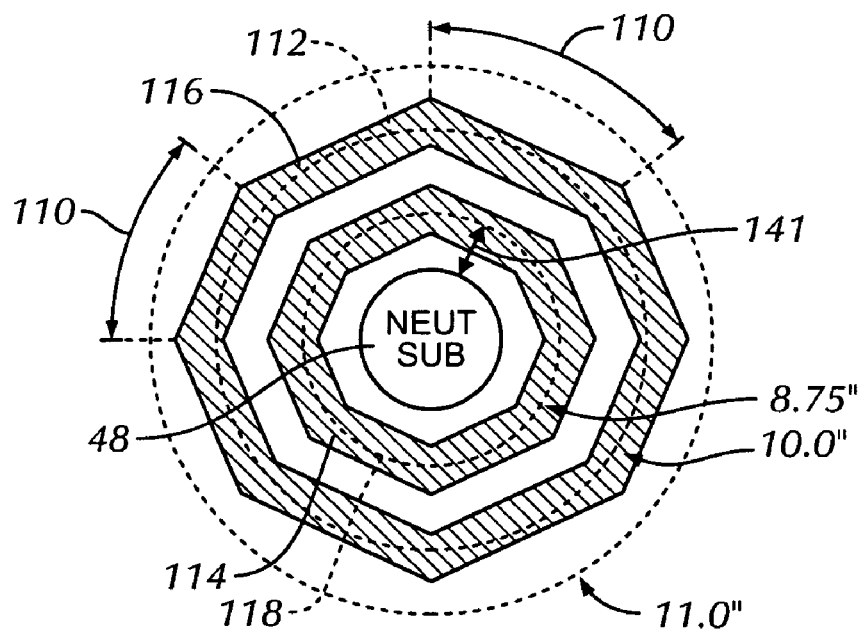
FIG. 9 is a cross sectional shows the radial position (i.e. standoff) of a LWD neutron porosity subsection determined in sample borehole diameters of 8.75 inches (22.2 centimeters) and 10.0 inches (25.4 centimeters)

FIG. 9 is a cross sectional shows a cross sectional image of the radial position (i.e. of the neutron porosity subsection 48 determined in sample borehole diameters of 8.75 inches (22.2 centimeters) shown as a broken curve at 118, and 10.0 inches (25.4 centimeters) shown as a broken curve at 112. Apparent borehole diameter and apparent standoff are shown in the image. Computations of apparent borehole diameter are made for azimuthal angles 110 as the tool rotates. In the example shown in FIG. 9, computations are made for azimuthal angles of 45 degrees. The shaded areas 114 and 116 illustrated uncertainty in the determinations for the 8.75 inch and 10.0 inch boreholes, respectively. For purposes of illustration, apparent azimuthal standoffs for representative azimuthal angles are indicated at 141 for the 8.75 inch borehole. In this example, the tool is centeralized. The data correctly depicted the position of the tool in the borehole for all borehole sizes within the stated range. The key difference in this measurement compared to a density or an acoustic caliper measurement is that this tool is calibrated centralized and the measurement is not focused, which gives it the ability to know its position in the borehole.

Figure 10:
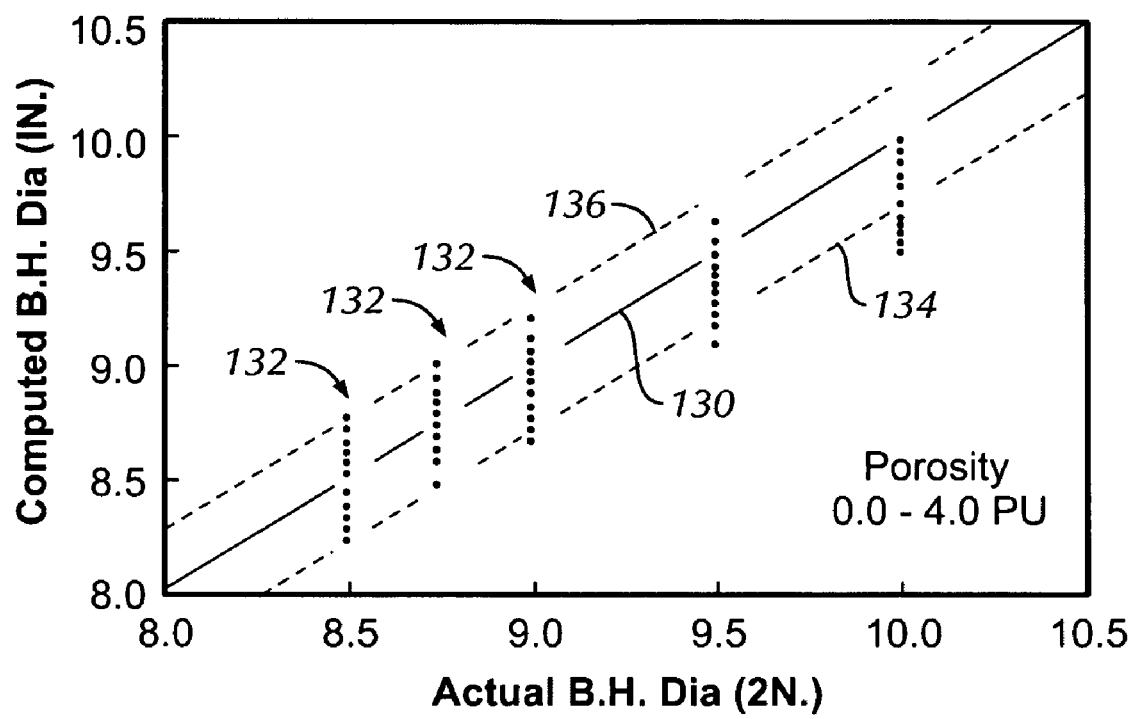
FIG. 10 is a plot of computed borehole diameter as a function of actual borehole diameter for a LWD neutron porosity subsection.

FIG. 10 is a plot of computed borehole diameter as a function of actual borehole diameter again using the algorithm shown in equation. (4). This plot illustrates the accuracy of the calculated borehole diameter with the neutron porosity subsection 48 with a 0.5 inch (1.27 centimeters) standoff. Clusters of data points at the designated actual borehole diameters are shown at 132. A straight line 130 has been fitted to these data for borehole diameters ranging from 8.0 to 10 inches (22.3 to 25.4 centimeters). The scatter of the data is illustrated by the lines 136 and 134. The accuracy of the calculated borehole diameter and radial standoff is still within +/−0.25 inches (0.63 centimeters) except for 10 inch (25.4 centimeter) borehole, where some of the data points are 0.5 inches (1.27 centimeters) off the true borehole diameter. Again, calculations are for the previously stated borehole and formation conditions after correcting for mud weight and formation mineralogy.

Figure 11:
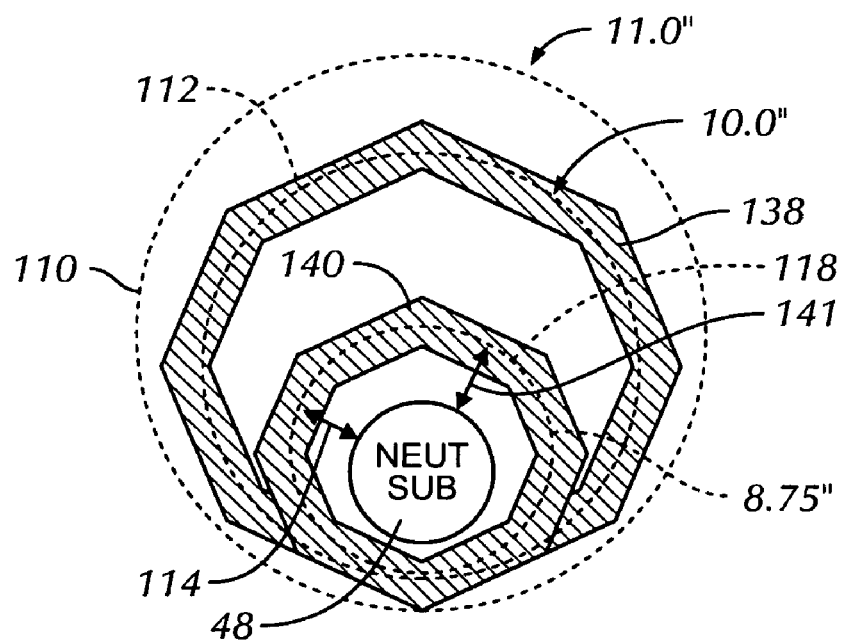
FIG. 11 is a cross sectional showing an eccentered radial position (i.e. standoff) of a LWD neutron porosity subsection determined in sample borehole diameters of 8.75 inches (22.2 centimeters) and 10.0 inches (25.4 centimeters).

FIG. 11 is another cross sectional image showing an eccentered radial position of the neutron porosity subsection 48 determined in sample borehole diameters of 8.75 inches (22.3 centimeters) shown as a broken curve at 118, and 10.0 inches (25.4 centimeters) shown as a broken curve at 112. As in FIG. 9, this image illustrates both borehole diameter and standoff. The shaded areas 140 and 138 illustrated uncertainty in the determinations for the 8.75 inch and 10.0 boreholes, respectively. Computations of apparent borehole diameter are again made for azimuthal angles 110 of 45 degrees as the tool rotates. Again for purposes of illustration, apparent azimuthal standoffs for representative azimuthal angles are indicated at 141 for the 8.75 inch borehole. The data correctly depicted the radial position of the tool in the borehole for all borehole sizes. The minimum tool standoff of 0.5 inches (1.27 centimeters) is shown at "bottom" of the borehole.

LWD neutron porosity subsection standoff (SO) and borehole diameter (BHD) have been obtained using methodologies of the present mathematically in equation (4). A corrected thermal neutron porosity for a LWD system, $\Phi_{C,LWD}$ corrected for all environmental conditions is obtained using methods set forth in the previously referenced "Experimental Determination of Environmental Corrections for a Dual-Spaced Neutron Porosity Log". The general mathematical functional relationship $F_{LWD}$ for LWD tools is $$\Phi_{C,LWD} = F_{LWD}(\Phi_{TH}, SO, BHD, ENV) \quad (5)$$

where ENV are other environmental corrections discussed in the "Experimental Determination of Environmental Corrections for a Dual-Spaced Neutron Porosity Log" and $\Phi_{TH}$ is given in equation (1).

Computations are preferably made in the downhole processor disposed in the electronics and power section 54 (see FIG. 2) and telemetered to the surface via a telemetry system.

The above disclosure is to be regarded as illustrative and not restrictive, and the invention is limited only by the claims that follow.

What is claimed is:

1. A method for determining standoff of a tool disposed within a borehole, the method comprising:
   (a) disposing an isotopic neutron source within said tool;
   (b) measuring a response of a first thermal neutron detector disposed within said tool at a first axial spacing from said source;
   (c) measuring a response of a second thermal neutron detector disposed within said tool at a second axial spacing from said source;
   (d) measuring a response of an epithermal neutron detector disposed within said tool at a third axial spacing from said source;
   (e) computing a thermal neutron porosity by combining said first and second thermal neutron detector responses;
   (f) computing an epithermal neutron porosity from said response of said epithermal neutron detector; and
   (g) computing the difference of said thermal neutron porosity and said epithermal neutron porosity and combining said difference with a measure of borehole diameter and mud weight and lithology to obtain said standoff.

2. The method of claim 1 wherein said tool is a neutron porosity subsection conveyed within said borehole by a wireline.

3. The method of claim 2 wherein;
   (a) said neutron porosity is conveyed within said borehole in combination with a density subsection; and
   (b) said measure of borehole diameter is obtained from a response of a mechanical caliper attached to said density subsection.

4. The method of claim 2 further comprising obtaining said standoff from computations in a surface processor.

5. The method of claim 1 wherein said tool is a LWD neutron porosity subsection conveyed within said borehole with a drill string.

6. The method of claim 5 further comprising:
   (a) determining said difference of said thermal neutron porosity and said epithermal neutron porosity in each of a plurality of azimuthal angles;
   (b) combining each said difference of said thermal neutron porosity and said epithermal neutron porosity with mud weight and lithology to determining an apparent borehole diameter for that angle;
   (c) combining said apparent borehole diameters for said plurality of angles to obtain an average borehole diameter; and
   (d) combining said average borehole diameter with each said apparent borehole diameter to obtain standoff as a function of azimuthal angle.

7. The method of claim 6 further comprising forming a cross sectional image of said neutron porosity subsection within said borehole using said standoff as a function of azimuthal angle and said average borehole diameter.

8. The method of claim 6 further comprising obtaining said standoff as a function of azimuthal angle with computations performed in a downhole processor.

9. Apparatus for determining standoff of a tool disposed within a borehole, the apparatus comprising:
   (a) an isotopic neutron source disposed within said tool;
   (b) a first thermal neutron detector disposed within said tool at a first axial spacing from said source;
   (c) a second thermal neutron detector disposed within said tool at a second axial spacing from said source;
   (d) an epithermal neutron detector disposed within said tool at a third axial spacing from said source; and
   (e) a processor
      for computing a thermal neutron porosity by combining said first and second thermal neutron detector responses,
      for computing an epithermal neutron porosity from said response of said epithermal neutron detector, and
      for computing the difference of said thermal neutron porosity and said epithermal neutron porosity and for combining said difference with a measure of borehole diameter and mud weight and lithology to obtain said standoff.

10. The apparatus of claim 9 wherein said tool is a neutron porosity subsection conveyed within said borehole by a wireline.

11. The apparatus of claim 10 wherein;
    (a) said neutron porosity is conveyed within said borehole in combination with a density subsection;
    (b) said processor is a surface processor; and
    (c) said measure of borehole diameter is obtained from a response of a mechanical caliper of said density subsection.

12. The apparatus of claim 9 wherein said tool is a LWD neutron porosity subsection conveyed within said borehole with a drill string.

13. The apparatus of claim 12 wherein said processor:
    (a) determines said difference of said thermal neutron porosity and said epithermal neutron porosity in each of a plurality of azimuthal angles;

(b) combines each said difference of said thermal neutron porosity and said epithermal neutron porosity with mud weight and lithology to determining an apparent borehole diameter for that angle;

(c) combines said apparent borehole diameters to obtain an average borehole diameter; and (d) combines said average borehole diameter with each said apparent borehole diameter to obtain standoff as a function of azimuthal angle.

14. The apparatus of claim 12 wherein said processor is a downhole processor.

* * * * *